United States Patent
Vaslin et al.

(10) Patent No.: US 8,293,313 B2
(45) Date of Patent: Oct. 23, 2012

(54) MICROFOAMED FRUIT OR VEGETABLE PUREE AND METHOD FOR PREPARING SAME

(75) Inventors: Sophie Vaslin, Saint-Cloud (FR); Céline Valentini, Chatillon (FR); Céline Balerin, Buc (FR)

(73) Assignee: Compagnie Gervais Danone, Paris (FR)

( * ) Notice: Subject to any disclaimer, the term of this patent is extended or adjusted under 35 U.S.C. 154(b) by 964 days.

(21) Appl. No.: 12/091,360

(22) PCT Filed: Oct. 26, 2006

(86) PCT No.: PCT/EP2006/067803
§ 371 (c)(1),
(2), (4) Date: Apr. 24, 2008

(87) PCT Pub. No.: WO2007/048818
PCT Pub. Date: May 3, 2007

(65) Prior Publication Data
US 2008/0317910 A1 Dec. 25, 2008

(30) Foreign Application Priority Data
Oct. 26, 2005 (FR) ...................................... 05 10926

(51) Int. Cl.
*A23L 1/212* (2006.01)
(52) U.S. Cl. .......................... 426/615; 426/519; 426/656
(58) Field of Classification Search .................. 426/615, 426/656, 519
See application file for complete search history.

(56) References Cited

U.S. PATENT DOCUMENTS

| | | | |
|---|---|---|---|
| 2,131,650 | A | 9/1938 | Webb |
| 3,978,243 | A | 8/1976 | Pedersen |
| 4,335,155 | A | 6/1982 | Blake et al. |
| 4,368,211 | A | 1/1983 | Blake et al. |
| 4,427,701 | A | 1/1984 | Morley |
| 4,623,551 | A | 11/1986 | Giddey et al. |
| 4,818,554 | A | 4/1989 | Giddey et al. |
| 4,851,239 | A | 7/1989 | Amen et al. |
| 6,248,378 | B1 | 6/2001 | Gañá-Calvo |
| 2005/0013919 | A1 | 1/2005 | Graham et al. |
| 2006/0292287 | A1 * | 12/2006 | Onwulata .................... 426/656 |

FOREIGN PATENT DOCUMENTS

| | | |
|---|---|---|
| DE | 363 8662 | 6/1987 |
| EP | 0 134 196 | 7/1984 |
| EP | 0 157 594 | 3/1985 |
| EP | 0 181 049 | 11/1985 |
| EP | 0 172 787 | 2/1986 |
| EP | 0 274 348 | 7/1988 |
| EP | 0 285 198 | 10/1988 |
| EP | 0 648 434 B1 | 4/1995 |
| EP | 0 777 969 A1 | 6/1997 |
| EP | 0 835 616 | 4/1998 |
| EP | 1 166 655 | 1/2002 |
| EP | 1 284 106 | 2/2003 |
| EP | 1 366 670 | 12/2003 |
| EP | 1 415 542 A1 | 5/2004 |
| HU | 0038811 | 7/1986 |
| JP | 62 083 856 | 4/1987 |
| JP | 6 227 56 52 A2 | 11/1987 |
| JP | 630 49040 A2 | 3/1988 |
| JP | 631 41547 A2 | 6/1988 |
| JP | 6325 104 8 A2 | 10/1988 |
| JP | 11225701 | 8/1999 |
| NL | 7313417 A | 9/1974 |
| SU | 1697 698 | 12/1991 |
| WO | WO 88/00796 | 2/1988 |
| WO | WO 96/31582 | 10/1996 |
| WO | WO 99/30812 | 6/1999 |
| WO | WO 00/38547 | 7/2000 |
| WO | WO 00/78156 | 12/2000 |
| WO | WO 01/35756 | 5/2001 |
| WO | WO 02/060283 | 8/2002 |
| WO | WO 03/053174 | 7/2003 |
| WO | WO 2004/004481 | 1/2004 |

OTHER PUBLICATIONS

Beard, J.*
Beard, James 1974 Beard on Food, "Fruit Sorbet", p. 1, 2. http://www.jamesbeard.org/index.php?q=recipes/print/1223.*
Cayot, Philippe and Lorient, Denis; Structures and technofunctions of milk proteins; (Arilait recherches, Edition Lavoisier 1998, $2^{nd}$ part, pp. 105-203.
International Search Report for PCT/EP2006/067803 filed Oct. 26, 2006.
Daneberg (figures 9.1 and 9.2).
Technical Sheet on Prolacta 90 (French only).
Technical Sheet on Promilk 852 Fb (French only).
Balerin et al: "*Effect of formulation and processing factors on the properties of liquid food foams*", Journal of Food Engineering, 78(2007), pp. 802-809.

* cited by examiner

Primary Examiner — Helen F Heggestad
(74) Attorney, Agent, or Firm — Alston & Bird LLP

(57) ABSTRACT

The invention concerns a microfoamed fruit or vegetable puree containing native defatted soluble seric proteins and optionally a texturing agent, the overrun being not more than 50%, the average diameter of the bubbles being less than 200 μm and the microfoamed fruit or vegetable purée being stable for at least 28 days at a temperature ranging between 1 and 10° C. The invention also concerns a method for preparing same.

21 Claims, No Drawings

MICROFOAMED FRUIT OR VEGETABLE PUREE AND METHOD FOR PREPARING SAME

CROSS REFERENCE TO RELATED APPLICATIONS

This application is a national stage application filed under 35 U.S.C. 371 of International Application No. PCT/EP2006/067803, filed Oct. 26, 2006, which claims priority from French patent application 0510926 filed Oct. 26, 2005.

FIELD AND BACKGROUND OF THE INVENTION

The present invention relates to a stable microfoamed fruit or vegetable purée and its preparation method.

Fruit purées can have a sticky pasty texture in the mouth, with slight astringency and marked acidity. To improve the sensory qualities of the fruit purée, and to reduce the volume of sugars, microfoaming of the purée has been the chosen technology.

Foamed food systems are complex, as they are made up of varied phases dispersed in a continuous aqueous medium, such as air bubbles or sugar crystals. To ensure robustness of formulations from an industrial viewpoint, while at the same time maintaining good organolepsy of these foams, particular attention is given to formulation in order to facilitate aptitude for foaming of the foam and guarantee its stability over time.

Fruit foams having a high foaming rate (50 to 100%) are already known in the prior art. However, microfoaming does not give the same result as classic foaming. In fact, microfoaming consists of injecting a very low quantity of air (<50% in volume, preferably <30% in volume, even better 20% in volume) for the purpose of producing bubbles of very low granulometry, nearly invisible to the naked eye, such as $D_{3,2} \leq$ less than 200 μm. The aim of this microfoaming is not to modify the macroscopic texture of the fruit or vegetable purée, as classic foaming might so, consisting of injecting 50 to 100% in air volume. On the contrary, the interest in this technology is modifying the sensory properties of the fruit or vegetable purée without modifying its visual appearance. The benefit is contributing a sort of "signature" of the fruit or vegetable purée, allowing it to stand out.

Of the ingredients utilised in making foams, the role of emulsifiers is a determinant in the process of forming the foam, while that of stabilising agents will essentially intervene in the stabilisation of the latter over its shelf life.

Gelatine occupies a place of choice among emulsifiers and the stabilising agents, in light of its multifunctional properties: in aerated systems, it plays two basic roles by acting as foaming agent, then allowing stabilisation of the aerated texture. However, its use is regularly put in question, for questions of food safety (BSE problem) or religious reasons. So replacing it is not simple.

In fact, the choice of emulsifier is important since it conditions the foaming aptitude of the fruit or vegetable purée.

Patent application WO 2004/04481 describes using seric proteins as emulsifier and in particular Lacprodan®. However, the seric proteins of Lacprodan® are not defatted. They contain around 4% by weight of fatty matter. In addition, seric proteins of Lacprodan® have been denatured since they have been pasteurised. According to the graphs of DANEBERG in the event of pasteurisation, the denaturation level of seric proteins is in general between 60 and 90%. Also, it is known that the fatty matter stabilises the resulting foams. Further, the overrun used in the foam described in this document is between 50 and 130%. For nutritional reasons there is therefore a need for fruit or vegetable foam stabilised without any fatty matter.

The U.S. Pat. No. 2,131,650 describes a fruit or vegetable foam containing the solid part of the milk serum obtained by precipitation of casein from milk. This solid part therefore contains casein as well as some lactoseric proteins, these proteins having been denatured during precipitation.

Patent application EP 1 166 655 describes a fruit foam obtained from denatured proteins. With a view to thermal treatment applied to paragraph [0021] of the document, a denaturation level between 93 and 100% is obtained. In the case of example 1, the proteins are totally denatured (denaturation level of 100%). Thus, none of the documents of the prior art describes or suggests using defatted and native seric proteins to produce a stable foam by a microfoaming method.

Yet, the inventors surprisingly found that "defatted" seric proteins, devoid of fatty matter, and native (that is non-denatured as are the by-products of the cheese industry) such as obtained by a method of microfiltration or ion chromatography exchange are excellent candidates for microfoaming of fruit or vegetable purées. These proteins remain native despite foaming, that is, they are not denatured by such mechanical treatment. In fact, according to the book by Philippe Cayot and Denis Lorient, "Structures and technofunctions of milk proteins" (Arilait recherches, Edition Lavoisier 1998, $2^{nd}$ part, pages 105-203), it is only thermal treatments and the pH modifications which can denature seric milk proteins. This is otherwise confirmed by patent application EP 1 284 106, paragraph [0017] which explains that denaturation of proteins in foam occurs only after foaming.

Further, the inventors of the present application found surprisingly that in the event where seric proteins are used as foaming agent, it is not always necessary to also use a texturing agent to maintain the stability of the stable microfoamed product and prevent an increase in the size of the bubbles. In fact, the quantity of pectins present in the majority of fruit or vegetable purées is sufficient to keep the microfoamed texture throughout conservation of the product.

SUMMARY OF THE INVENTION

The present invention therefore relates to a microfoamed fruit or vegetable purée containing native defatted soluble seric proteins and optionally a texturing agent, the overrun being less than or equal to 50%, the average diameter of bubbles being less than 200 μm and the microfoamed fruit or vegetable purée being stable over at least 28 days at a temperature between 1 and 10° C.

In the sense of the present invention, the term of "microfoaming" means the injection of a very small amount of gas (<50% in volume, preferably <30% in volume, advantageously=20% in volume) to produce after foaming bubbles of very low granulometry, virtually invisible to the naked eye, the average diameter of the bubbles being less than 200 μm. Advantageously, the injected gas is traditionally selected from air and nitrogen, but may also contain oxide of $N_2(N_2O)$ or $CO_2$.

In the sense of the present invention, the term of "microfoamed fruit or vegetable purée" means the purée obtained as a result of microfoaming according to the present invention.

The overrun of a microfoamed fruit or vegetable purée according to the present invention is therefore <50%, preferably <30%, advantageously=20%. The overrun is defined as the volume fraction of gas in the microfoamed products and is defined as follows:

$$\text{Overrun} = \frac{(\text{unfoamed product pot mass} - \text{foamed product pot mass}) \times 100}{\text{unfoamed product pot mass}}$$

The average diameter of a bubble $D_{3.2}$ responds to the following equation: $D_{3.2} = \text{sum } (i=1 \text{ to } n) d_i^3 / \text{sum } (i=1 \text{ to } n) d_i^2$ Advantageously the average diameter $D_{3.2}$ of the bubbles is between 50 and 200 μm, advantageously between 80 and 180 μm, even more advantageously between 100 and 150 μm.

In the sense of the present invention, the term of "native" means any non-denatured or very slightly denatured protein (the denaturation level of proteins can be calculated by quantification of the percentage of non-solubilised seric proteins at their isoelectric pH). This is therefore not a by-product of the cheese industry. Further, thermal treatment applied to it if necessary must be done at a temperature which does not cause denaturation of the protein and over sufficient but limited time. Advantageously native defatted soluble seric proteins are obtained by a method of demineralisation and/or ultrafiltration and/or microfiltration of milk deprived of heat or by a chemical or enzymatic treatment of milk. Advantageously, the denaturation level of seric proteins is less than 5%, advantageously, less than 2%, even more advantageously it is around 1%. These methods preserve the natural quality and bioactivity of the seric proteins obtained. Advantageously seric proteins according to the present invention contain at least 50% by weight of beta-lactoglobulin, advantageously, 57% by weight and advantageously less than 20% by weight of α-lactalbumin, advantageously 18% by weight.

In the sense of the present invention the term of "defatted" means any protein containing less than 1% by weight of fatty matter, advantageously less than 0.5% by weight, advantageously around 0.4% by weight of fatty matter.

Advantageously, these native defatted soluble seric proteins originate from isolates of native defatted soluble seric proteins of which the native defatted soluble seric proteins content is advantageously greater than 80% by weight, advantageously greater than 90% by weight.

Advantageously, these isolates contain little lactose, advantageously less than 10% by weight, advantageously, less than 4% by weight, even more advantageously around 3% by weight.

Advantageously, the isolates of native defatted soluble seric proteins are Prolacta 90 marketed by Lactalis company, Ultra whey-99 marketed by Volactive company or Promilk 852 FB marketed by Ingredia company.

The microfoamed fruit or vegetable purée according to the present invention advantageously contains between 0.08 and 2% by weight of native defatted soluble seric proteins relative to the total weight of the fruit or vegetable purée, advantageously between 0.09% and 2% by weight of native defatted soluble seric proteins relative to the total weight of the fruit or vegetable purée, even more advantageously between 0.1% and 2% by weight of native defatted soluble seric proteins relative to the total weight of the fruit or vegetable purée.

In the sense of the present invention the term of "fruit or vegetable purée" is understood to mean a fermentable but non-fermented product obtained by screening or other similar method of the comestible part of fruits or vegetables whole or peeled without eliminating juice. The purée can be concentrated and in this case is obtained from fruit or vegetable purée by physical elimination of a determined part of water of constitution.

Advantageously, the fruit is selected from the fruits known to the one skilled in the art such as for example apple, banana, raspberry, pear, mango, strawberry, peach and apricot.

Advantageously, the vegetable is selected from vegetables known to the one skilled in the art, such as for example carrot, beetroot and tomato.

In the sense of the present invention, the term of "texturing agent" means any additive designed to give a determined structure and consistency to the purée according to the present invention. Advantageously, it is selected from agar agar, carrageenan and pectin.

Advantageously, this is pectin which is a gelling substance currently found in the vegetable kingdom and often used for thickening jams and jellies. The concentration of texturing agent is advantageously between 0.1 and 2% by weight relative to the total weight of the microfoamed fruit or vegetable purée according to the present invention.

Advantageously, the microfoamed fruit or vegetable purée according to the present invention contains no gelatine.

In an advantageously manner, the microfoamed fruit or vegetable purée according to the present invention is pasteurised, frozen or not. Even more advantageously the microfoamed fruit or vegetable purée according to the present invention has a Brix value of between 10° and 35°.

The microfoamed fruit or vegetable purées according to the present invention have organoleptic qualities of slightly aerated texture, melt-in-the-mouth and a drop in astringency and acidity. Also, the purée taste is not modified relative to a non-microfoamed purée and the flavour and perception of the fruits or vegetables is intact.

In addition, microfoaming of the fruit or vegetable purée according to the present invention brings out the sugary taste of this purée. So the microfoamed fruit or vegetable purée according to the present invention advantageously has natural sugar contents and contains no added sugar. The sugar content is advantageously between 4 and 40% by weight relative to the total weight of the microfoamed fruit or vegetable purée according to the present invention.

The present invention further relates to a multilayer fresh food product, advantageously bilayer, comprising at least one layer of fresh acid or neutral milk product, advantageously fermented, and at least one layer of microfoamed fruit or vegetable purée according to the present invention.

The layer of microfoamed fruit or vegetable purée according to the present invention is advantageously situated at the surface of the fresh acid or neutral milk product.

By advantageously manner, the layer of microfoamed fruit or vegetable purée according to the present invention is covered by a layer of fresh acid or neutral milk product.

So it is possible to have for example:
a multilayer product comprising the following successive layers (from bottom of the pot towards the surface): a layer of fresh acid or neutral milk product, a layer of microfoamed fruit or vegetable purée according to the present invention and a layer of fresh acid or neutral milk product, or a bilayer product comprising the following successive layers (from bottom of the pot towards the surface): a layer of fresh acid or neutral milk product, a layer of microfoamed fruit or vegetable purée according to the present invention;

a bilayer product comprising the following successive layers (from bottom of the pot towards the surface): a layer of microfoamed fruit or vegetable purée according to the present invention and a layer of fresh acid or neutral milk product.

It also relates to a fresh food product comprising a mixture of a fresh acid or neutral milk product and a microfoamed fruit or vegetable purée according to the present invention.

In the sense of the present invention, the term of "milk product" means any acid or neutral milk product and therefore any milk product fermented or acidified via ingredients (advantageously by lactic, citric or phosphoric acid) of pH acid (advantageously its pH is less than 4.8, advantageously it is between 3 and 4.8) or neutral (advantageously its pH is between 4.8 and 7.3, advantageously between 5.5 and 6.8). In particular it can be fresh cheese or a fermented product containing live ferments (for example acid cream, kefir or others) and especially yoghurt or speciality assimilated fermented milks (fermented by lactic bacteria, such as *bifidus actif* or *L. casei*). Within the scope of the present invention acidic milk products will be preferred, advantageously fermented, advantageously of yoghurt type. Advantageously this is stirred yoghurt. Advantageously, the product is fermented by the addition of living ferments such as for example *Lactobacillus bulgaricus, Streptococcus thermophilus* and/or *Lactobacillus acidophilus* and/or bifidus. Advantageously, the milk utilised in the milk product is cows' milk. However, other milks can be utilised in total or partial substitution of cow's milk, such as for example goat's milk, ewe, buffalo or mare's milk, or less advantageous milks of vegetable origin, such as soy milk, coconut or oat milk.

The pasteurised or sterilised and optionally fermented acid or neutral milk product is obtained according to methods well known to the one skilled in the art. In particular the method for producing fermented pasteurised acid milk product comprises the following successive steps:
homogenisation of the milk product,
pasteurisation of the milk product,
cooling of the milk product,
inoculation,
fermentation to the desired acidity.

Briefly, the method begins with raw milk which can also contain a combination of whole milk, skim milk, condensed milk, dried milk (dried defatted extract of milk or equivalent), category A lactoserum, cream and/or other fraction ingredients of milk such as for example buttermilk, lactoserum, lactose or lactoserum modified by partial or total removal of lactose and/or minerals or other milk ingredients to boost the defatted solid content, which are mixed to provide the desired fatty matter and solids content. Although not preferred within the scope of the present invention, the milk product can contain a milk filler constituent, i.e. a milk ingredient of which a portion is constituted by a non-milk ingredient, such as for example oil or soy milk. By way of advantage, the fresh milk product according to the present invention is a low-fat product, i.e. containing from 0 to 15% by weight, advantageously from 0 to 5% by weight of fatty matter relative to the total weight of the milk product, apart from the fruit or vegetable purée.

Advantageously the fresh milk product according to the present invention contains no gelatine.

In a particular embodiment of the invention, the fresh food product according to the present invention outside fruit or vegetable purée, contains other ingredients, advantageously selected from sugar syrups, cream, fruit pieces and cocoa. Advantageously, the fresh food products according to the present invention are stable for a period of at least between 12 and 28 days, at a temperature between 1 and 10° C.

The present invention further relates to a method for preparing a microfoamed fruit or vegetable purée according to the present invention, the method comprising the following successive steps:

a) mixing 90 to 98% by weight, advantageously 95% by weight, of a fruit or vegetable purée and 2 to 10% by weight, advantageously 5% by weight of a non-foamed foaming aqueous solution comprising native defatted soluble seric proteins and optionally a texturing agent, b) microfoaming of the mixture and c) recovering the microfoamed fruit or vegetable purée.

Advantageously, the mixture coming from step (a) has a viscosity of between 0.5 and 8 Pa·s at 100 s$^{-1}$.

A static foaming device can be utilised during step (b) of the method according to the present invention. Its drawback is greater destructuration of the fruit or vegetable purée as this step (b) is being conducted. Also, the bubbles obtained using this type of foaming device are definitely smaller size but are less stable.

Thus, step (b) is advantageously conducted using a dynamic foaming device, for example of Mondomix® type.

By way of advantage, the mixing step (a) between the fruit or vegetable purée and the foaming aqueous solution and the microfoaming step (b) are conducted simultaneously in a single step.

Advantageously, the method according to the present invention comprises an additional step (d) of packaging of microfoamed fruit or vegetable purée.

In a particular embodiment the method according to the present invention comprises a preliminary step (a) of preparing the foaming aqueous solution.

Advantageously the preparation of the non-foamed foaming aqueous solution comprises the following steps:

(1) mixing of the native defatted soluble seric proteins, advantageously in the form of isolates, water and optionally texturing agent without incorporating air, advantageously with strong agitation;

(2) acidification, advantageously with citric or malic acid, advantageously to a pH between 4 and 4.8, advantageously 4.6, (3) thermal treatment, advantageously at a temperature between 60 and 72° C. for a duration of 10 to 1 nm, advantageously for 1 minute at 72° C.

(4) homogenisation of the mixture obtained, advantageously at a pressure between 3·10$^6$ Pa and 10·10$^6$ Pa.

By way of advantage, mixing the ingredients in water is followed by a hydration step (1a), advantageously for between 30 minutes and 1 hour, prior to the acidification step (2).

Advantageously the aqueous solution foaming contains between 0.2 and 1% by weight of native defatted soluble seric proteins relative to the total weight of the foaming aqueous solution, advantageously between 0.5 and 0.8% by weight of native defatted soluble seric proteins relative to the total weight of the foaming aqueous solution.

Advantageously, water used during step (1) was sterilised then cooled to 70-72° C. to allow introduction of the seric proteins and any texturing agent.

The present invention further relates to a method for preparing a fresh food multilayer product, advantageously bilayer, by successive injection, advantageously directly into a pot, of the layers of the multilayer products according to the present invention.

Mastering the microfoaming method requires good knowledge of the parameters of the method, such as pressure in the foaming head, the foaming temperature connected to formulation parameters, such as for example the concentration of native defatted seric soluble proteins.

EXAMPLES

The following examples are given by way of non-limiting indication.

Example 1

Preparation of Microfoamed Apple Purée According to the Present Invention

The apple purée is made from fresh fruits reduced to purée by fine screening and concentrated by evaporation. It contains no other ingredient or additive. The apple purée is then concentrated under vacuum 3× and has a Brix between 30° and 32° (Brix more or less translates the quantity of natural sugars). It has a pH of 3.7 and a density of 1.12.

1—Preliminary Assay: Aptitude Foaming Test with a KitchenAid Hand Mixer

In the first instance, the foaming aptitude of the apple purée was evaluated, i.e. its capacity to incorporate air during beating (whisk, speed 8, over 5 min) and its capacity to stabilise the air bubbles dispersed in the hours following beating.

Result: Only a small quantity of air could be incorporated over 5 min of beating, and the bubbles formed are very large and coalesce rapidly incorporating air is due a priori only to the viscosity of the purée, and is not stabilised.

Conclusion: The apple purée can not foam without addition of surfactants to form and stabilise the air/purée interfaces.

2—Preparation of Microfoamed Apple Purée

The objective is to aerate the purée, with small stable bubbles: for this, two formulation factors are decisive, specifically rheology and the interfacial properties of the medium.

From the rheological viewpoint, the apple purée offers sufficient viscosity to maintain the bubbles during dispersion, and above all a flow threshold for limiting the destabilisation of the foam at rest: adding a texturising agent or gelling agent does not seem necessary, all the more since the quantity of pectins present in the apple purée seems to be sufficient for texturing the product. Dilution of the purée will simply be limited to keep a high level of viscosity.

From the interfacial viewpoint, as shown during preliminary assay, adding surfactants is indispensable to forming and stabilising the gas/purée interfaces. And, it is necessary to ensure significant elasticity of the interfaces to limit the risks of coalescence and ripening: the bubbles must remain stable for a minimum of 28 days, in a concentrated suspension matrix (fruit purée=suspension of pulp in a serum).

The formulation used is the following: 95% by weight of apple purée+5% by weight of a non-foamed foaming aqueous solution containing water and Prolacta90 from Lactalis. A final concentration of Prolacta90 of 1.11% by weight is obtained, or a proportion by weight of seric proteins of 1%.

The mixture was aerated using a dynamic foaming tool: the Mini Mondomix®.

The geometry of the foaming device head is of "rotor" type (cogged rotor and stator, Mondomix® type), with a beating volume of 500 mL and air gaps of 2.5 mm.

The head speed is 240 rpm.

The pressure in the foaming head is fixed at $4\times10^5$ Pa absolute.

The rate is 4.4 kg/h.

Result: foaming conducted continuously, with controlled material and gas rates, on the formulation described earlier resulted in homogeneous and stable foams.

The foaming aptitude of the formula and the stability of the foams were demonstrated with an industrial method but on a laboratory scale.

Size of bubbles: visible bubbles, around 180 μm at D1.

Stability: strong evolution from D0 to D1, then clear stability (valid to 28D).

Adjusting the tested method produces homogeneous and stable foam, with small visible bubbles. It should be noted that the colour and presence of particles in the purée make the bubbles "barely visible"; and, optimisation of the head speed of the foaming device should decrease the size of the bubbles.

Example 2

Preparation of a Microfoamed Strawberry Purée According to the Present Invention The strawberry purée used is a purée of strawberries concentrated 3× obtained as for apple purée according to example 1 (21° Brix; pH 3.1).

To compensate for the low viscosity of the purée (<at 0.4 Pa·s to 100 s$^{-1}$) a texturing agent was added: 0.8% by weight of pectin. Adding this texturing agent raises the level of viscosity of the mixture and ensures stability of the microfoamed purée over 28 days. The manufacturing method and formulation are the same as in example 1. The size of the bubbles at D0 is around 150 μm. This size evolves little over the period in question (28 days).

Example 3

Preparation of a Bilayer Product Containing a Layer of Microfoamed Apple Purée According to Example 1 and a Layer of Stirred Low-Fat Yoghurt The Products are Made from 50% by Weight of Taillefine Nature Brassé (% fatty matter 0.15, % Proteins=4.35, % carbohydrate content=0, Dry extract=11-12) (layer at bottom of the pot) and 50% by weight of the microfoamed apple purée according to example 1 (layer on top of the yoghurt). Each of the layers is dosed directly in the pot using apparatus of Dosys® type.

The bilayer product obtained is also stable (no colour transfer) for 28 days. From the organoleptic viewpoint the colour/texture/flavour contrast is very interesting, the sticking of the fruit purée disappearing due to microfoaming.

The invention claimed is:

1. Microfoamed fruit or vegetable purée containing native defatted soluble seric proteins and optionally a texturing agent, the overrun being less than or equal to 50%, the average diameter of the bubbles being less than 200 μm and the microfoamed fruit or vegetable purée being stable for at least 28 days at a temperature between 1 and 10°C., and wherein the native defatted soluble seric proteins contain at least 50% by weight of beta-lacto-globulin.

2. The microfoamed fruit or vegetable purée according to claim 1, wherein the fruit is selected from apple, banana, raspberry and strawberry.

3. The microfoamed fruit or vegetable purée according to claim 1, wherein it contains between 0.08 and 2% by weight of native defatted soluble seric proteins relative to the total weight of the fruit or vegetable purée.

4. The microfoamed fruit or vegetable purée according to claim 1, wherein the texturing agent is pectin.

5. The microfoamed fruit or vegetable purée according to claim 1, wherein it contains no gelatine.

6. The microfoamed fruit or vegetable purée according to claim 1, wherein it is deep-frozen or pasteurised and wherein it has a Brix value of between 10° and 35°.

7. A fresh multilayer food product comprising at least one layer of fresh acid or neutral milk product, and at least one layer of microfoamed fruit or vegetable purée according to claim 1.

8. A fresh food product comprising a mixture of a fresh acid or neutral milk product and a microfoamed fruit or vegetable purée according to claim 1.

9. A method for preparing a microfoamed fruit or vegetable purée according to claim 1 comprising the following successive steps:
 a) mixing 90 to 98% by weight, of a fruit or vegetable purée and 2 to 10% by weight, of a non-foamed foaming aqueous solution comprising native defatted soluble seric proteins and optionally a texturing agent, wherein the native defatted soluble seric proteins contain at least 50% by weight of beta-lacto-globulin;
 b) microfoaming of the mixture and
 c) recovering the microfoamed fruit or vegetable purée.

10. The method according to claim 9, wherein the mixture coming from step (a) has a viscosity between 0.5 and 8 Pa.s at $100\ s^{-1}$.

11. The method according to claim 9 wherein the native defatted soluble seric proteins are in the form of isolates.

12. The method according to claim 9, wherein it comprises a preliminary step ($\alpha$) of preparing the non-foamed foaming aqueous solution.

13. The method according to claim 12, wherein the preparation of the non-foamed foaming aqueous solution comprises the following steps:
 (1) mixing the native defatted soluble seric proteins, water and optionally texturing agent without incorporating air,
 (2) acidification,
 (3) thermal treatment,
 (4) homogenisation of the resulting mixture.

14. The method according to claim 9, wherein it comprises an additional step (d) of packaging the microfoamed fruit or vegetable purée.

15. The fresh multilayer food product according to claim 7 wherein the milk product is fermented milk product.

16. The method according to claim 9 wherein step (a) consists in mixing 95% by weight of a fruit or vegetable purée and 5% by weight of said non-foamed foaming aqueous solution comprising native defatted soluble seric proteins and optionally a texturing agent.

17. The method according to claim 9 wherein step b) is carried out by a dynamic foaming device.

18. The method according to claim 13 wherein the native defatted soluble seric proteins of step (1) are in the form of isolates.

19. The method according to claim 13 wherein step (2) of acidification is carried out with citric acid.

20. The method according to claim 13 wherein step (2) of acidification is carried out up to a pH between 4 and 4.8.

21. The method according to claim 13 wherein step (3) of thermal treatment is carried out at 72° C. for 1 min.

* * * * *

UNITED STATES PATENT AND TRADEMARK OFFICE
CERTIFICATE OF CORRECTION

PATENT NO. : 8,293,313 B2
APPLICATION NO. : 12/091360
DATED : October 23, 2012
INVENTOR(S) : Vaslin et al.

Page 1 of 1

It is certified that error appears in the above-identified patent and that said Letters Patent is hereby corrected as shown below:

In the Specifications:

Column 6,
Line 24, "(a)" should read --($\alpha$)--.

Signed and Sealed this
Thirtieth Day of April, 2013

Teresa Stanek Rea
*Acting Director of the United States Patent and Trademark Office*